(12) United States Patent
Andersson et al.

(10) Patent No.: US 12,215,244 B1
(45) Date of Patent: Feb. 4, 2025

(54) WET LOOK COATING COMPOSITIONS, ARTICLES, AND METHODS

(71) Applicant: SWIMC LLC, Cleveland, OH (US)

(72) Inventors: Matthew Andersson, Chicago, IL (US); Ashley Rodgers, Rockford, IL (US); Chris Lefever, Belvidere, IL (US); Karl Booth, Mundelein, IL (US); Christopher Savittieri, Woodstock, IL (US); Robert Sandoval, Crystal Lake, IL (US); Michael C. Wildman, Hoffman Estates, IL (US); Patrick C. Swearingen, Elgin, IL (US); Thao Mee Xiong, Crystal Lake, IL (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/438,269

(22) Filed: Feb. 9, 2024

(51) Int. Cl.
  *C09D 119/02* (2006.01)

(52) U.S. Cl.
  CPC .................................. *C09D 119/02* (2013.01)

(58) Field of Classification Search
  None
  See application file for complete search history.

(56) References Cited

U.S. PATENT DOCUMENTS

| | | | |
|---|---|---|---|
| 4,022,730 A | 5/1977 | Lewis et al. | |
| 5,035,944 A | 7/1991 | Frazza et al. | |
| 5,431,960 A | 7/1995 | Watts | |
| 5,910,369 A | 6/1999 | Macris et al. | |
| 5,977,228 A | 11/1999 | Mauer | |
| 6,548,596 B1 | 4/2003 | Kohr et al. | |
| 6,698,149 B1 | 3/2004 | Ruchgy | |
| 6,713,548 B1 | 3/2004 | Zhang et al. | |
| 6,762,230 B2 | 7/2004 | Bradenburger et al. | |
| 6,777,026 B2 | 8/2004 | Halladay et al. | |
| 7,527,861 B2 | 5/2009 | Li et al. | |
| 7,812,079 B2 | 10/2010 | Bradenburger et al. | |
| 7,982,380 B2 | 7/2011 | Kamiyama et al. | |
| 8,298,674 B2 | 10/2012 | Elgarhy | |
| 8,381,483 B1 | 2/2013 | Goldman | |
| 8,642,177 B2 | 2/2014 | Rosen et al. | |
| 9,145,484 B2 | 9/2015 | Gane et al. | |
| 9,359,520 B2 | 6/2016 | Killilea et al. | |

(Continued)

FOREIGN PATENT DOCUMENTS

| | | |
|---|---|---|
| CA | 2522638 A1 | 4/2006 |
| DE | 102009009004 A1 | 9/2009 |

(Continued)

OTHER PUBLICATIONS

ASTM D2244-16, "Standard Practice for Calculation of Color Tolerances and Color Differences from Instrumentally Measured Color Coordinates," *ASTM International*, Jun. 29, 2021: 12 pgs.

(Continued)

*Primary Examiner* — Peter A Salamon
(74) *Attorney, Agent, or Firm* — Mueting Raasch Group (57) ABSTRACT

Aqueous wet look coating compositions, articles having a coating formed from such compositions (e.g., coated cementitious substrates), and methods, wherein the coating compositions are low VOC compositions and include a multi-stage latex emulsion polymerized polymer including interpolymerized monomers including DAAM.

30 Claims, 3 Drawing Sheets

(56) References Cited

U.S. PATENT DOCUMENTS

| | | |
|---|---|---|
| 9,603,788 B2 | 3/2017 | Mimura et al. |
| 10,800,866 B2 | 10/2020 | Williams et al. |
| 10,851,025 B2 | 12/2020 | Crenshaw et al. |
| 10,865,284 B2 | 12/2020 | Sick et al. |
| 2004/0115357 A1 | 6/2004 | Ma et al. |
| 2004/0131786 A1 | 7/2004 | Ma et al. |
| 2005/0107527 A1 | 5/2005 | Holub et al. |
| 2005/0137322 A1 | 6/2005 | Roesler et al. |
| 2005/0154084 A1 | 7/2005 | Li et al. |
| 2005/0154107 A1 | 7/2005 | Li et al. |
| 2005/0154109 A1 | 7/2005 | Li et al. |
| 2005/0215678 A1 | 9/2005 | Ludtke et al. |
| 2006/0054056 A1 | 3/2006 | Jungk |
| 2007/0166258 A1 | 7/2007 | Pratley et al. |
| 2007/0282046 A1 | 12/2007 | Killilea et al. |
| 2010/0283007 A1 | 11/2010 | Robinson |
| 2015/0004420 A1 | 1/2015 | Hill et al. |
| 2015/0175834 A1 | 6/2015 | Yokoyama et al. |
| 2018/0002564 A1 | 1/2018 | Overman |
| 2019/0345361 A1 | 11/2019 | Sick et al. |
| 2020/0362191 A1* | 11/2020 | Sandoval ................ C08F 8/32 |
| 2021/0122871 A1 | 4/2021 | Salviato et al. |

FOREIGN PATENT DOCUMENTS

| | | |
|---|---|---|
| GB | 2201104 A | 8/1988 |
| IN | 2015MU04039 A | 4/2017 |
| JP | 2005023149 A | 1/2005 |
| WO | WO 93/22372 A1 | 11/1993 |
| WO | WO 2003/076537 A1 | 9/2003 |
| WO | WO 2016/149499 A1 | 9/2016 |
| WO | WO 2016/178244 A2 | 11/2016 |
| WO | WO 2019/126520 A1 | 6/2019 |

OTHER PUBLICATIONS

ASTM D6886-18, "Standard Test Method for Determination of the Weight Percent Individual Volatile Organic Compounds in Waterborne Air-Dry Coatings by Gas Chromatography," *ASTM International*, Oct. 29, 2018; 11 pgs.

* cited by examiner

WET LOOK COATING COMPOSITIONS, ARTICLES, AND METHODS

BACKGROUND

Certain substrates, including porous or cementitious substrates, such as concrete, brick, masonry, stone, and the like, often experience damage from weather and from exposure to water. Conventionally, to avoid such damage, these substrates are sealed by the application of a coating composition that prevents penetration of water into these materials. Additionally, coatings are often applied to obtain a certain desirable look. It is often desirable for the sealant to provide an appearance that the substrate is wet with water or "wet look."

Many of the sealers currently available on the market are based on acrylic technology. Many solvent-borne sealers leave the material with a wet look, however, typical waterborne (i.e, aqueous) acrylic sealers do not provide the true wet look desired for these substrates. Many products claim to impart a wet look but fail to achieve the deepening or enhancement of color expected. Moreover, products that exhibit an optimal wet look are often deficient in other coating properties desired for such sealer compositions. Water-borne materials are desirable in these applications for many reasons including convenience of water-based cleanup, lower amounts of volatile organic solvents, and reduced odor.

From the foregoing, it will be appreciated that what is needed in the art is an aqueous coating composition that provides an optimal wet look when applied to a cementitious substrate, but without sacrificing other desirable coating properties.

SUMMARY OF THE DISCLOSURE

The present disclosure provides aqueous wet look coating compositions, articles having a coating formed from such compositions (e.g., coated cementitious substrates), and methods (e.g., methods of making a latex dispersion, methods of coating such composition and methods of causing the composition to be used for certain coating end uses).

The coating compositions are low VOC compositions and include a multistage latex polymer (preferably, an emulsion polymerized polymer) that includes interpolymerized monomers including diacetone acrylamide (DAAM). More specifically, and preferably, the polymer includes an emulsion polymerized first stage and an emulsion polymerized second stage, and optionally one or more additional stages. Although these stages are preferably added as emulsions, they may alternatively be added as neat feeds or polymerized as a batch, all of which result in emulsion polymerized polymers.

In one embodiment, a low VOC aqueous wet look coating composition includes: a multistage latex polymer including an emulsion polymerized first stage and an emulsion polymerized second stage; wherein the multistage latex polymer includes interpolymerized monomers including DAAM; wherein at least one stage has a Tg (preferably, a measured Tg) of at least 60° C.; and wherein the composition has a VOC content of less than 100 g VOC/L, according to ASTM D6886-2018.

In certain embodiments, the multistage latex polymer includes a chain transfer agent, preferably in an amount of greater than 1 weight percent (wt-%), based on the total weight of monomers used to form the multistage latex).

In one embodiment, an article includes a cementitious substrate having a hardened coating formed from a wet look coating composition as described herein disposed on at least a portion thereof.

Methods are also provided.

In one embodiment, a method of making a latex dispersion includes: combining monomers under conditions effective to form an emulsion polymerized first stage and an emulsion polymerized second stage; wherein the first stage, the second stage, or both comprises DAAM; and adding greater than 1 wt-% of a chain transfer agent, based on the total weight of monomers; wherein at least one stage has a Tg (preferably, a measured Tg) of at least 60° C.; wherein the latex dispersion comprises less than 100 g VOC/L, according to ASTM D6886-2018.

In one embodiment, a method of coating a cementitious substrate includes providing a wet look coating composition as described herein; applying the coating composition to at least a portion of a cementitious substrate; and allowing the coating composition to harden (e.g., dry) to form a hardened coating disposed on the cementitious substrate.

In another embodiment, a method of coating a cementitious substrate includes causing a wet look coating composition as described herein to be applied to at least a portion of a cementitious substrate to provide a hardened wet look coating. In this context, "causing" means applying the coating composition to a cementitious substrate, instructing it to be applied to a cementitious substrate, or supplying it to a user to apply it to a cementitious substrate.

The term "wet look." as used herein refers to the appearance of a coating when applied to a porous or cementitious surface, and indicates a glossy finish with deepened enhanced colors similar to the appearance of the substrate when it is wet with water.

For environmental and regulatory reasons, it has become imperative to prepare polymer dispersions and coating compositions without the use of volatile organic compounds (VOCs) or with limited use of VOCs. The term "volatile organic compound" ("VOC"), as defined by the Environmental Protection Agency (EPA) in 40 C.F.R. 51.100 (s), refers to any compound of carbon, excluding carbon monoxide, carbon dioxide, carbonic acid, metallic carbides or carbonates, and ammonium carbonate, which participates in 20 atmospheric photochemical reactions. Typically, volatile organic compounds have a vapor pressure equal to or greater than 0.1 mm Hg. As used herein, "volatile organic compound content" ("VOC content") in a coating composition is as measured by ASTM method D6886-2018, and refers to the mass of VOC per volume of the coating, and is reported, for example, as grams VOC per liter (g/L). With respect to a latex dispersion described herein, VOC may also be reported as grams VOC per 100 grams of latex dispersion (with reference to grams of the solids in the latex). EPA Method 24 may be used to determine VOC in the alternative. If unstated or otherwise unclear from context with respect to a particular VOC measure, in the present application, ASTM method D6886-18 is the method used.

In certain embodiments, the latex polymer dispersion has a VOC content of less than 100 g/L, less than 50 g/L, less than 20 g/L, or less than 10 g/L. In certain embodiments, the coating composition has a VOC content of less than 100 g/L, less than 50 g/L, less than 20 g/L, or less than 10 g/L. Preferably, both the latex polymer dispersion and the coating composition have a VOC content of less than 100 g/L, less than 50 g/L, less than 20 g/L, or less than 10 g/L.

The term "substantially free of VOC" means that the composition of the present invention contains less than 100 g/L VOC. Unless otherwise indicated, the terms "low VOC" and "substantially free of VOC" are used interchangeably herein. In contrast, a "high VOC" component (e.g., coalescent) or composition includes 100 g/L VOC or more. The term "essentially free of VOC" means that the compositions of the present invention contain less than 5 g/L of VOC. The terms, "zero VOC" and "essentially free of VOC" are used interchangeably herein.

A "hardened" coating refers to one wherein the coating composition is dried or thermally cures to form a hardened coating and/or the polymer is covalently cured via a crosslinking reaction, and adhered to a cementitious substrate, thereby forming a coated cementitious substrate. It does not imply any particular level of hardness and/or scratch resistance.

The phrase "total resin solids" refers to the nonvolatile organic content of the coating composition, which includes the polymer solids content of the resin as well as other nonvolatile additives, e.g., surfactants (but not organic solvent). This can be determined by simply driving off the liquid and measuring the remaining solids, or calculating based on starting materials.

The terms "polymer" and "polymeric material" include, but are not limited to, organic homopolymers, copolymers, such as for example, block, graft, statistical, including random, and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element, or group of steps or elements, but not the exclusion of any other step or element, or group of steps or elements. The phrase "consisting of" means including, and limited to, whatever follows the phrase "consisting of." Thus, the phrase "consisting of" indicates that the listed elements are required or mandatory, and that no other elements may be present. The phrase "consisting essentially of" means including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may, or may not, be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50). Herein, "at least" a number (e.g., at least 50) includes the number (e.g., 50). Herein, "no more than" a number (e.g., no more than 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" or "ambient temperature" refers to a temperature of 20° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the disclosure, guidance is provided through lists of examples, which examples may be used in various combinations. In each instance, the recited list serves only as a representative group and should not be interpreted as an exclusive or exhaustive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

BRIEF DESCRIPTION OF THE FIGURES

FIG. 1A is a composition containing a conventional multistage differential-Tg latex with 0.25% chain transfer agent (CTA) added in an attempt to enhance wet look.

FIG. 1B is a composition containing polymer of Example 1.

FIG. 1C is the commercial Behr Wet Look Sealer.

FIG. 1D has no coating applied (except for slight bleed from the adjoining section).

FIG. 1E had water applied shortly before the photo was taken.

FIG. 1F is a composition containing the styrene-EHMA copolymer (a solution acrylic) referred to in the Wet Look Test.

DETAILED DESCRIPTION OF ILLUSTRATIVE EMBODIMENTS

The present disclosure provides aqueous wet look coating compositions, articles having a coating formed from such compositions (e.g., coated cementitious substrates), and methods. The coating compositions are low VOC compositions and include a multistage latex polymer, preferably, an emulsion polymerized polymer. The polymer includes interpolymerized monomers including DAAM. More specifically, the polymer includes an emulsion polymerized first stage and an emulsion polymerized second stage, at least one of which has a Tg (preferably, a measured Tg) of at least 60° C. Although these stages are preferably added as emulsions, they may alternatively be added as neat feeds or polymerized as a batch, all of which result in emulsion polymerized polymers.

A wet look on a cementitious substrate is a glossy surface. Preferably, a wet look on a cementitious substrate is a darkening of the color of the surface, as when water is on the surface. Obtaining such wet darkening without giving up durability, particularly blush durability, is important.

Solution polymers inherently have good wet look because the polymer chains are molecularly dissolved into a solvent. Therefore, the polymer chains are better able to penetrate concrete. With emulsion polymers, where the polymer chains are in discrete particles, the chains do not have as much chain mobility and are unable to penetrate as well as solution polymers into the concrete. The present disclosure provides a latex polymer and coating composition that has improved wet look compared to other aqueous emulsion polymers, with a low amount of blushing.

In certain embodiments, the compositions of the present disclosure provide a hardened coating having a percent wet look that is greater than 50%, greater than 40%, greater than 30%, greater than 25%, or greater than 20% on a cementitious substrate according to the Wet Look Test described in the Examples Section.

In certain embodiments, the compositions of the present disclosure provide a hardened coating having a 6-hour percent blush that is less than 20%, less than 15%, or less than 10% on black glass according to the Blushing Test described in the Examples Section. In certain embodiments, the compositions of the present disclosure provide a hardened coating having a 12-hour percent blush that is less than 20%, less than 15%, or less than 10% on black glass according to the Blushing Test described in the Examples Section.

Latex Polymers

The latex polymer is a multistage latex polymer, such as a classic core-shell(s) latex polymer. In certain embodiments, the multistage latex polymer is a two- or more-stage emulsion polymerized latex polymer (e.g., resulting from a power feed process). Other morphologies that could result from a multistage latex polymer include, for example, moon-like 3rd quarter, moon-like 1st quarter, eye-ball-like, acorn-like, octopus-like, raspberry-like, occlusion or salami-like.

In this context, the term "multistage" when used with respect to a latex polymer means the polymer was made using discrete charges of two or more monomers, made using a varying (e.g., continuously varying) charge of two or more monomers, or made using a combination of both discrete charges and varying charges of two or more monomers. A multistage polymer is distinct from a single stage polymer made using one type of monomer blend with distinct polymer seed particles. Frequently, a multistage polymer consists of polymer stages with different Tg's, where the higher Tg stages are considered the hard stages and the lower Tg stages are considered the soft stages.

Herein, the Tg's can be measured using differential scanning calorimetry (DSC). Alternatively, the Tg's can be calculated Fox Tg's. In certain embodiments, the multistage latex polymer has an overall Fox equation Tg of at most 5° C. If a polymeric particulate seed is used to facilitate formation of the multistage latex, the monomers used to form the particulate seed are not factored into the overall Fox equation Tg of the multistage latex.

Usually, a multistage latex will not exhibit a single Tg inflection point as measured by differential scanning calorimetry (DSC). For example, a DSC curve for a multistage latex made using discrete charges of two or more monomers may exhibit two or more Tg inflection points. Also, a DSC curve for a multistage latex made using a continuously varied charge of two or more monomers may exhibit no Tg inflection points. By way of further explanation, a DSC curve for a single stage latex made using a single monomer charge or a non-varying charge of two monomers may exhibit only a single Tg inflection point. Occasionally when only one Tg inflection point is observed it may be difficult to determine whether the latex represents a multistage latex. In such cases a lower Tg inflection point may sometimes be detected on closer inspection, or the synthetic scheme used to make the latex may be examined to determine whether or not a multistage latex would be expected to be produced.

In certain embodiments, latex polymers are typically made using seed particles as a nucleating agent for polymerization. Such seed particles may be in the form of inorganic particulate seed (e.g., clay or glass particles), preformed particulate polymer seed (latex or non-latex polymer seed), or particulate seed polymer formed in situ. Polymer seed can be an emulsion polymerized polymer seed, but does not encompass polymeric surfactant. In certain embodiments, seed particles are used in an amount of no more than 10 wt-%, or no more than 5 wt-%, based on latex polymer solids in the final latex.

Herein, whether inorganic particulate seed, preformed particulate polymer seed, or particulate seed polymer formed in situ, such seed particles will not be deemed to provide a stage of a multistage polymer or to provide a basis for designating a single stage polymer made using such seed polymer as a multistage polymer.

Latex polymers described herein may or may not have a glass transition temperature that is measurable. As used herein, the term "glass transition temperature" or "Tg" refers to the temperature at which an amorphous, solid material undergoes a reversible transition to a molten, rubber-like state. The Tg may be measured using DSC, or calculated using the Fox equation. Application of the Fox equation to estimate the Tg of polymers is well known to one skilled in the art.

In certain embodiments, the latex polymer has a measured Tg, as measured by DSC. Such Tg may be measured at the beginning, mid-point, or end of polymerization. In certain embodiments, however, the latex polymer may have no clearly measurable Tg.

In certain embodiments, the latex polymer is a multistage polymer having at least one measured Tg and at least one Fox Tg (which are not alternative representations of the same glass transition). Herein, "Fox Tg" and "calculated Tg" and "calculated Fox Tg" are used interchangeably.

The Tg of a particular stage, or combination of stages, can be estimated (i.e., calculated) using the Fox equation. For example, for a polymer made from two monomers in a particular stage, the theoretical Tg may be calculated using the Fox equation as follows:

$$1/Tg = Wa/Tga + Wb/Tgb$$

wherein:
Tga and Tgb are the respective glass transition temperatures in Kelvin of homopolymers made from monomers "a" and "b"; and
Wa and Wb are the respective weight fractions of polymers "a" and "b".

When additional monomer feeds "c" and "d" and so on are employed, additional fractions Wc/Tgc, Wd/Tgd and so on are added to the right-hand side of the above equation. Unless indicated otherwise, the "calculated" stage or polymer Tg's referenced herein are calculated using the Fox equation. Also, the calculation is based on all of the monomers that are reacted together to form a stage, and not upon merely a portion of such monomers.

The value of Tg of the monomers used to estimate the polymer Tg are based on literature values. Typically, there is some variation of the Tg values of the homopolymers of monomers listed in such literature. The difference arises from the test method used to measure the Tg. The differences also arise from influence of comonomers polymerized together. For the purposes of this disclosure, the values used for the homopolymer Tg of certain monomers, particularly monomers used in the examples are listed herein (e.g., in the Materials Table in the Examples Section). Alternatively, the method of determining the Tg of a homopolymer can be determined using the DSC procedure described in the Examples Section, particularly if the literature values are significantly different (e.g., the literature values vary by at least 15° C.). If the literature values vary by less than 15° C., then use the lower literature value.

In certain embodiments, the multistage latex polymer may be a gradient latex polymer (i.e., gradient Tg latex polymer), although a preferred multistage latex polymer has discrete stages, particularly a core and a shell. The stages may be made in batches or using sequential feed, or a combination thereof. Typically, a gradient Tg latex polymer will have a DSC (differential scanning calorimetry) curve that exhibits no Tg inflection points, and could be said to have an essentially infinite number of Tg stages. For example, one may start with a high Tg monomer feed and then at a certain point in the polymerization start to feed a low Tg soft stage monomer composition into the high Tg hard stage monomer feed. The resulting multistage latex polymer will have a gradient Tg from high to low. In other embodiments, it may be favorable to feed a high Tg hard stage monomer composition into a low Tg soft stage monomer composition.

In certain aspects, a multistage latex described herein preferably includes at least two polymer portions, e.g., a first stage and a second stage, with different Tg values, where the difference in Tg (delta Tg) is at least 50° C., at least 55° C., or at least 60° C. In certain aspects, the delta Tg is up to 150° C., up to 145° C., up to 140° C., or up to 135° C. Preferably, the Tg is a measured Tg.

In certain aspects, a multistage latex described herein has a first stage (e.g., a hard stage) having a Tg (e.g., a Fox Equation Tg) of at least 60° C., or at least 70° C., and preferably up to 110° C., up to 100° C., or up to 90° C. In certain aspects, a multistage latex described herein has a second stage (e.g., a soft stage) having a Tg (e.g., a Fox Equation Tg) of up to −20° C., or up to −30° C., and preferably at least −60° C., or at least −50° C. Thus, a preferred hard stage is defined as having a Tg of 60° C. to 110° C. and a preferred soft stage is defined as having a Tg of −60° C. to −20° C. Preferably, the Tg is a measured Tg.

In some embodiments, a multistage latex described herein will include at least 10 wt-%, at least 20 wt-%, at least 30 wt-%, at least 40 wt-%, at least 50 wt-% of the hard stage(s) (typically the first or core of a classic core-shell), based on the total weight of the hard stage(s) and soft stage(s). In some embodiments, a multistage latex described herein will include up to 90 wt-%, up to 80 wt-%, up to 70 wt-%, up to 60 wt-%, up to 50 wt-% of the hard stage(s) (typically the first or core of a classic core-shell), based on the total weight of the hard stage(s) and soft stage(s). Thus, the range of ratios of hard to soft stages is 10:90 to 50:50, preferably 20:80 to 40:60, more preferably 30:70 to 50:50, wherein the hard and soft stages are defined to have Tg ranges as above.

The first and second stages can be polymerized in any order. For example, in some embodiments the first stage is polymerized first, whereas in other embodiments the second stage is polymerized first. Thus, in some embodiments, for example, the hard stage is located towards the interior of the latex particle (e.g., as the "core" stage in a classic core/shell latex particle) and the soft stage is located towards the exterior of the latex particles (e.g., as a "shell" stage in a classic core/shell latex particle).

For gradient Tg latex polymers, a Tg differential may be determined by using the Fox equation to calculate the theoretical Tg for a copolymer made from the monomer feed at the start of polymerization and comparing the result to the calculated theoretical Tg for a copolymer made from the second feed. Such gradient Tg can result from the second monomer feed being combined into the first monomer feed to form a gradient architecture, or ultimately result from two monomer feeds being combined at differential rates (e.g., the rate of one monomer feed increases while the rate of a second monomer feed decreases).

In certain embodiments, there may be a discrete measurable Tg of a latex polymer, such discrete Tg is typically corresponding to the polymer resulting from polymerization of the first monomer feed, or to a mixture of the first monomer feed and a small amount of the second monomer feed.

The multistage latex polymer (preferably, emulsion polymerized multistage latex polymer) used in the coating compositions of the present disclosure includes interpolymerized monomers including diacetone acrylamide (DAAM) and one or more secondary monomers. The DAAM may be included in any stage of the multistage polymer, preferably it is used in the first stage. Secondary monomers generally include ethylenically unsaturated monomers.

In certain preferred embodiments, a majority of the interpolymerized monomers of the multistage latex polymer of the present disclosure are (meth)acrylate monomers. That is, in certain preferred embodiments, greater than 50 wt-%, greater than 60 wt-%, greater than 70 wt-%, or greater than 80 wt-% of the interpolymerized monomers of the multistage latex polymer of the present disclosure are (meth) acrylate monomers.

In certain embodiments, the multistage latex polymer includes greater than 0 wt-%, at least 0.5 wt-%, or at least 1 wt-%, of DAAM, based on the total weight of the interpolymerized monomers. In certain embodiments, the multistage latex polymer includes no more than 15 wt-%, no more than 10 wt-%, no more than 5 wt-%, no more than 4 wt-%, no more than 3 wt-%, or no more than 2 wt-%, of DAAM, based on the total weight of the interpolymerized monomers.

In certain embodiments, DAAM is included in the first stage (referred to herein as "M1") used to make the polymer, which typically forms at least an "inner" stage preferably located towards the interior (i.e., core) relative to one or more "external" or shell stages, and preferably the core of a classic core-shell, although this is not a necessary requirement. In certain embodiments, first stage of the multistage latex polymer includes greater than 0 wt-%, at least 0.1 wt-%, at least 0.2 wt-%, at least 0.3 wt-%, at least 0.4 wt-%, at least 0.5 wt-%, at least 1 wt-%, at least 1.5 wt-%, at least 2 wt-%, at least 3 wt-%, at least 4 wt-%, at least 5 wt-%, of DAAM, based on the total weight of the interpolymerized monomers in the first stage. In certain embodiments, the first stage of the multistage latex polymer includes no more than 50 wt-%, no more than 40 wt-%, no more than 30 wt-%, or no more than 20 wt-%, of DAAM, based on the total weight of the interpolymerized monomers in the first stage.

In certain embodiments, the secondary interpolymerized monomers include ethylenically unsaturated acid monomers, ethylenically unsaturated non-ionic monomers, or a combination thereof. Typically, both acid monomers and non-ionic monomers are used to make the latex polymer of the present disclosure.

One or more ethylenically unsaturated acid monomers may be included in any stage of the multistage polymer, preferably one or more such monomers are used in all stages. Examples of ethylenically unsaturated acid monomers include, but are not limited to, acrylic acid, methacrylic acid, crotonic acid, itaconic acid, fumaric acid, maleic acid, and maleic anhydride. Various combinations of acid monomers may be used to obtain a desired result. Preferably, the acid monomers include methacrylic acid.

In certain embodiments, the multistage latex polymer includes at least 0.5 wt-%, at least 1 wt-%, at least 1.5 wt-%, at least 2 wt-%, or at least 2.5 wt-% of an ethylenically unsaturated acid monomer, based on the total weight of the interpolymerized monomers. In certain embodiments, the multistage latex polymer includes no more than 10 wt-%, no more than 8 wt-%, no more than 6 wt-%, or no more than 4 wt-%, of an ethylenically unsaturated acid monomer, based on the total weight of the interpolymerized monomers.

Herein, the total weight of the interpolymerized monomers (e.g., in the overall polymer or in a particular stage) referenced does not include any monomers that may have been used to form a seed.

In certain embodiments, an ethylenically unsaturated acid monomer is included in the first stage used to make the polymer, which typically forms the core of core-shell polymer particles, although this is not a necessary requirement. In certain embodiments, the first stage of the multistage latex polymer includes at least 0.5 wt-%, at least 1 wt-%, at least 1.5 wt-%, at least 2 wt-%, or at least 2.5 wt-%, of an ethylenically unsaturated acid monomer, based on the total weight of the interpolymerized monomers in the first stage. In certain embodiments, the first stage of the multistage latex polymer includes up to 10 wt-%, up to 8 wt-%, up to 6 wt-%, or up to 4 wt-%, of an ethylenically unsaturated acid monomer, based on the total weight of the interpolymerized monomers in the first stage.

In certain embodiments, an ethylenically unsaturated acid monomer is included in the second stage (herein referred to as "M2"), or an outermost stage. In certain embodiments, the second or outermost stage of the multistage latex polymer includes at least 0.5 wt-%, 1 wt-%, at least 1.5 wt-%, at least 2 wt-%, or at least 2.5 wt-%, of an ethylenically unsaturated acid monomer, based on the total weight of the interpolymerized monomers in the second or outermost stage. In certain embodiments, the second or outermost stage of the multistage latex polymer includes up to 10 wt-%, up to 8 wt-%, up to 6 wt-%, or up to 4 wt-%, of an ethylenically unsaturated acid monomer, based on the total weight of the interpolymerized monomers in the second or outermost stage.

One or more ethylenically unsaturated non-ionic monomers may be included in any stage of the multistage polymer, preferably one or more such monomers are used in all stages. Ethylenically unsaturated non-ionic monomers include, but are not limited to, (meth)acrylic ester monomers such as methyl acrylate, methyl methacrylate, ethyl acrylate, ethyl methacrylate, n-butyl acrylate, n-butyl methacrylate, t-butyl acrylate, t-butyl methacrylate, 2-ethylhexyl acrylate, decyl acrylate, lauryl acrylate, lauryl methacrylate, hydroxyethyl methacrylate, hydroxypropyl methacrylate, isodecyl methacrylate, (meth)acrylonitrile, (meth)acrylamide, n-methylol acrylamide, amino-functional and ureido-functional monomers, styrene and substituted styrenes, butadiene, ethylene, propylene, alpha-olefins such as 1-decene, vinyl acetate, vinyl butyrate and other vinyl esters, and vinyl monomers such as vinyl chloride and vinylidene chloride.

If styrene is present as one of the ethylenically unsaturated non-ionic monomers, it is preferably present in an amount of less than 15 wt-%, less than 10 wt-%, less than 5 wt-%, less than 4 wt-%, less than 3 wt-%, less than 2 wt-%, or less than 1 wt-%, based on the total weight of the interpolymerized monomers. In certain embodiments, there is no styrene in the latex polymer other than the seed, if present.

Suitable ureido-functional monomers include, for example, monomers with the —NR—(C=O)—NH— functionality, where R may be H, substituted or unsubstituted $C_1$-$C_{10}$ alkyl, substituted or unsubstituted $C_3$-$C_6$ cycloalkyl or heteroalkyl, and the like. Without being bound by theory, ureido-functional monomers are believed to promote the wet adhesion of a coating composition to a substrate, where the composition includes the multistage latex described herein. Preferred ureido-functional monomers include allyl ureido monomers such as that available from Solvay under the trade name SIPOMER WAM or SIPOMER WAM II, and from BASF under the trade name Ureido Methacrylate 25% (UMA 25%). Another ureido-functional monomer is available under the trade name VISIOMER MEEU 25 M (an ureido methacrylate solution containing 25% ureido methacrylate in MMA (methyl methacrylate)) from Evonik, Atlanta, GA.

Various combinations of non-ionic monomers may be used to obtain a desired result. Preferably, the non-ionic monomers include methyl methacrylate, butyl acrylate, butyl methacrylate, and an allyl ureido monomer.

In certain embodiments, the multistage latex polymer includes at least 85 wt-%, at least 90 wt-%, or at least 95 wt-% of an ethylenically unsaturated non-ionic monomer, based on the total weight of the interpolymerized monomers. In certain embodiments, the multistage latex polymer includes up to 99 wt-%, up to 98 wt-%, or up to 97 wt-%, of an ethylenically unsaturated non-ionic monomer, based on the total weight of the interpolymerized monomers.

In certain embodiments, an ethylenically unsaturated non-ionic monomer is included in the first stage used to make the polymer, which typically forms the core of core-shell polymer particles, although this is not a necessary requirement. In certain embodiments, the first stage of the multistage latex polymer includes at least 85 wt-%, at least 90 wt-%, or at least 95 wt-%, of an ethylenically unsaturated non-ionic monomer, based on the total weight of the interpolymerized monomers in the first stage. In certain embodiments, the first stage of the multistage latex polymer includes up to 99 wt-%, up to 98 wt-%, or up to 97 wt-%, of an ethylenically unsaturated non-ionic monomer, based on the total weight of the interpolymerized monomers in the first stage. (Meth)acrylate monomers (e.g., alkyl or cycloaliphatic acrylate or methacrylate monomers) are preferred non-ionic monomers. Examples of suitable (meth)acrylate monomers are disclosed herein in the context of, for example, secondary monomers. In certain embodiments, the first stage of the multistage latex polymer includes at least 85 wt-%, at least 90 wt-%, or at least 95 wt-%, of one or more (meth)acrylate monomers, based on the total weight of the interpolymerized monomers in the first stage.

In certain embodiments, an ethylenically unsaturated non-ionic monomer is included in the second stage used to make the polymer, which typically forms the shell of core-shell polymer particles, although this is not a necessary requirement. In certain embodiments, the second stage of the multistage latex polymer includes at least 85 wt-%, at least 90 wt-%, or at least 95 wt-%, of an ethylenically unsaturated non-ionic monomer, based on the total weight of the interpolymerized monomers in the second stage. In certain embodiments, the second stage of the multistage latex polymer includes up to 99 wt-%, up to 98 wt-%, or up to 97 wt-%, of an ethylenically unsaturated non-ionic monomer, based on the total weight of the interpolymerized monomers in the second stage. (Meth)acrylate monomers (e.g., alkyl or cycloaliphatic acrylate or methacrylate monomers) are preferred non-ionic monomers. Examples of suitable (meth)acrylate monomers are disclosed herein in the context of, for example, secondary monomers. In certain embodiments, the second stage of the multistage latex polymer includes at least 85 wt-%, at least 90 wt-%, or at least 95 wt-%, of one or more (meth)acrylate monomers, based on the total weight of the interpolymerized monomers in the second stage.\

In some embodiments, the multistage latex includes at least 85 wt-%, at least 90 wt-%, or at least 95 wt-%, of one or more (meth)acrylate monomers, based on the total weight of the interpolymerized monomers used to form the latex.

In certain embodiments, the secondary interpolymerized monomers include ethylenically unsaturated phosphorus-functional monomers (e.g., phosphate ester-containing monomers). One or more ethylenically unsaturated phosphorus-functional monomers may be included in any stage of the multistage polymer, preferably one or more such monomers are used in all stages. Examples of ethylenically unsaturated phosphorus-functional monomers include, but are not limited to, those available under the trade names SIPOMER PAM 200, SIPOMER PAM 600, and SIPOMER PAM 4000 from Solvay, and HARCRYL 1228 from Harcros Chemicals. Various combinations of phosphorus-functional monomers may be used to obtain a desired result.

In certain embodiments, the multistage latex polymer includes at least 0.1 wt-%, at least 0.3 wt-%, or at least 0.5 wt-% of an ethylenically unsaturated phosphorus-functional monomer, based on the total weight of the interpolymerized monomers. In certain embodiments, the multistage latex polymer includes up to 2 wt-%, up to 1.8 wt-%, or up to 1.6 wt-%, of an ethylenically unsaturated phosphorus-functional monomer, based on the total weight of the interpolymerized monomers.

In certain embodiments, an ethylenically unsaturated phosphorus-functional monomer is included in the first stage used to make the polymer, which typically forms the core of core-shell polymer particles, although this is not a necessary requirement. In certain embodiments, the first stage of the multistage latex polymer includes at least 0.1 wt-%, at least 0.3 wt-%, or at least 0.5 wt-%, of an ethylenically unsaturated phosphorus-functional monomer, based on the total weight of the interpolymerized monomers in the first stage. In certain embodiments, the first stage of the multistage latex polymer includes up to 2 wt-%, up to 1.8 wt-%, or up to 1.6 wt-%, of an ethylenically unsaturated phosphorus-functional monomer, based on the total weight of the interpolymerized monomers in the first stage.

In certain embodiments, an ethylenically unsaturated acid monomer is included in the second stage used to make the polymer, which typically forms the shell of core-shell polymer particles, although this is not a necessary requirement. In certain embodiments, the second stage of the multistage latex polymer includes at least 0.1 wt-%, at least 0.3 wt-%, or at least 0.5 wt-%, of an ethylenically unsaturated phosphorus-functional monomer, based on the total weight of the interpolymerized monomers in the second stage. In certain embodiments, the second stage of the multistage latex polymer includes up to 2 wt-%, up to 1.8 wt-%, or up to 1.6 wt-%, of an ethylenically unsaturated phosphorus-functional monomer, based on the total weight of the interpolymerized monomers in the second stage.

Latex polymers may be made from the described monomers using a variety of techniques known to one skilled in the art. Typically, such polymers are made from an aqueous emulsion that includes one or more monomers as described herein, preferably using a multistage feed process. In certain embodiments, after the latex polymer is formed in water, more water may be added to obtain a desired solids level.

Such multistage feed processes (e.g., powerfeed methods) for producing emulsion copolymers are well-known. They enable one to constantly vary the composition of monomers being polymerized to produce copolymers having a variety of desired properties. For example, in certain embodiments a gradient is achieved by changing the feed rate of a second monomer mixture into a first monomer mixture.

There is no required order of mixing monomers or required combination of monomers. Furthermore, there is no requirements regarding which monomers may be mixed with which monomers. In certain preferred embodiments, however, the DAAM monomer is added in the first stage of a multistage process.

In certain embodiments, the latex polymer is formed from components that also include one or more chain transfer agents (i.e., radical transfer agents). A chain transfer agent is a compound that is used in free-radical polymerizations and functions as a molecular weight modifier. It typically reduces the molecular weight of the polymer and causes radical transfer. Without being limited by theory, it is believed that the chain transfer agent improves polymer chain mobility, which allows the polymer chains to better penetrate into a porous substrate and improve the wet look. Thus, regardless of the morphology of the multistage latex polymer, a sufficient amount of low molecular weight chains are preferably surface presenting to allow for penetration into a porous substrate.

Although a chain transfer agent is not required for all embodiments, it is preferred. In certain embodiments, the chain transfer agents are selected from dodecanethiol, 3-mercaptopropionic acid, isooctyl thioglycolate, butyl mercapto propionate, and combinations thereof. In certain embodiments, a chain transfer agent is present in an amount of greater than 1 wt-%, at least 1.1 wt-%, at least 1.2 wt-%, at least 1.3 wt-%, or at least 1.4 wt-%, based on the total weight of monomers. If used, in certain embodiments, a chain transfer agent is present in an amount of up to 6 wt-%, up to 5 wt-%, up to 4 wt-%, up to 3 wt-%, or up to 2 wt-%, based on the total weight of monomers.

In certain embodiments, the latex polymer (i.e., latex dispersion) may be made using a crosslinking molecule for crosslinking (preferably, keto-hydrazide crosslinking) with DAAM. Such molecule can be, for example, a molecule containing reactive amine or hydrazide groups. Preferably, the crosslinking molecule contains multiple —NH$_2$ or —NH— functionality, such as hydrazine, aliphatic polyamines such as ethylene diamine, propanediamine, butanediamine, hexanediamine, isophorone diamine, piperazine, diethylene triamine, dipropylene triamine, triethylene tetramine, and other such oligomers or polymers of ethylene diamine known as polyethylene amines (also known as polyaziradines or poly(ethyleneimines)), or a polyfunctional carboxylic hydrazide containing at least two hydrazide groups per molecule, such as adipic dihydrazide, oxalic dihydrazide, isophthalic dihydrazide, or polyacrylic polyhydrazide. Preferably, the polyfunctional carboxylic hydrazide is adipic dihydrazide.

In various embodiments, the amount of crosslinking molecule used is such that the ratio of reactive amine or hydrazide groups to keto groups present in the emulsion is typically less than 0.5, less than 0.45, less than 0.4, less than 0.35, less than 0.3, less than 0.25, or less than 0.2. In various embodiments, the amount of crosslinking molecule used is such that the ratio of reactive amine or hydrazide groups to keto groups present in the emulsion is typically greater than 0.05, greater than 0.1, or greater than 0.15.

Conventional oil-soluble and/or, preferably, water-soluble free radical initiators may be used, such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, etc.

Redox systems using the same initiators, coupled with a suitable reductant, such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfite, hydrosulfide or dithionite, formadinesulfinic acid, hydroxymethanesulfonic acid, acetone bisulfite, etc., may be used.

Polymerization of any of the stages of the multistage latex (preferably, emulsion polymerized) polymer may be facilitated by the incorporation of an emulsifier. Nonpolymeric surfactants such as sodium lauryl ether sulfate, sodium lauryl sulfate sodium lauryl ether sulfate succinate, phosphate esters, ammonium-s-ethyl hexyl sulfate, sodium lauryl benzene sulfonate, and polyethylene glycol mono(octylphenyl) ether phosphate are preferred emulsifiers. Typically, at least 0.2 wt-%, at least 0.5 wt-%, at least 1 wt-%, at least 1.5 wt-%, at least 2 wt-%, or at least of an emulsifier is used in any one stage, based on the total weight of the monomers of the stage. Typically, no more than 5 wt-% of an emulsifier is used in any one stage, based on the total weight of the monomers of the stage.

The resultant latex polymer is a multistage latex polymer aqueous dispersion of latex particles in water. In certain embodiments, the multistage latex polymer used in the coating compositions of the present disclosure includes latex particles having a volume average particle size of at least 50 nanometers (nm), or at least 60 nm, or at least 70 nm. In certain embodiments, the multistage latex polymer of the present disclosure includes latex particles having a volume average particle size of up to 150 nm, or up to 130 nm. Particle size can be determined by a particle size analyzer.

In some embodiments, a latex polymer dispersion includes up to 70 wt-%, up to 65 wt-%, or up to 60 wt-% total resin solids. In some embodiments, a latex polymer dispersion includes at least 30 wt-%, at least 35 wt-%, or at least 40 wt-% total resin solids.

Coating Compositions and Methods of Making

The wet look coating compositions of the present disclosure include a multistage latex polymer aqueous dispersion as described herein and a liquid carrier (e.g., water and/or an organic solvent).

In certain embodiments, the coating composition includes at least 10 wt-%, or at least 15 wt-% of a multistage (preferably, emulsion) latex polymer as described herein, based on the total weight of the coating composition (including water and optional additives). In certain embodiments, the coating composition includes up to 70 wt-%, up to 60 wt-%, up to 50 wt-%, up to 40 wt-%, or up to 30 wt-% of a multistage (preferably, emulsion) latex polymer, based on the total weight of the coating composition (including water and optional additives).

In some embodiments, a coating composition includes up to 70 wt-%, up to 65 wt-%, or up to 60 wt-% total resin solids. In some embodiments, a coating composition includes at least 10 wt-%, at least 15 wt-%, at least 20 wt-%, or at least 25 wt-% total resin solids.

In preferred embodiments, the coating compositions of the present disclosure include water and may further include one or more optional organic solvents. Such compositions are referred to herein as aqueous coating compositions. In an embodiment, the present description provides water-based coating composition.

In some embodiments, the coating composition includes at least 40 wt-%, or at least 50 wt-%, water, based on the total weight of the coating composition. In some embodiments, the coating composition includes no more than 90 wt-%, no more than 85 wt-%, no more than 75 wt-%, no more than 60 wt-%, or no more than 55 wt-%, water, based on the total weight of the coating composition.

In some embodiments, the coating composition includes at least 0.1 wt-%, at least 0.5 wt-%, at least 1 wt-%, or at least 5 wt-%, of one or more organic solvents, based on the total weight of the coating composition.

In some embodiments, the aqueous liquid carrier includes at least 50 wt-%, at least 60 wt-%, at least 70 wt-%, or at least 80 wt-%, of water, based on the total weight of the liquid carrier (which will typically include liquid from the latex polymerization process). In some embodiments, the aqueous liquid carrier includes 100 wt-% or less, 95 wt-% or less, or 90 wt-% or less, of water, based on the total weight of the liquid carrier. In some embodiments, the liquid carrier is free or substantially free of organic solvent.

In some embodiments, the organic solvent includes ethylene glycol monobutyl ether, ethylene glycol monohexyl ether, diethylene glycol monoethyl ether, isopropanol, butanol, or combinations thereof.

The amount of liquid carrier included in a coating composition of the present disclosure is limited by the desired, or necessary, rheological properties of the composition. Usually, a sufficient amount of carrier is included in the coating composition to provide a composition that can be processed easily and that can be applied to a cementitious substrate easily and uniformly using a particular application process, and that is sufficiently removed from the coating composition in a desired period of time.

In certain embodiments, a coating composition has a viscosity of at least 50 centipoise (cps). In certain embodiments, a coating composition has a viscosity of up to 1000 cps, up to 500 cps, or up to 200 cps. Viscosity of the coating composition can be measured using a viscometer (e.g., a Brookfield viscometer) at ambient temperature.

In certain embodiments, the coating compositions of the present disclosure are storage stable under normal storage conditions (e.g., ambient temperature and not stored in direct sunlight, such as when stored in a cabinet) for at least 2 months, preferably at least 3 months, more preferably at least 4 months, or most preferably at least 6 months. In this context, storage stable means that the compositions do not phase separate (e.g., separate into two or more layers) as determined by the unaided human eye.

The coating compositions as described herein may be made by conventional methods known to those of skill in the art. For example, the latex polymer dispersion may be made into a formulation of the coating composition by the addition of adjuvants and other additives conventional in the art.

Optional Additives in Coating Compositions

In certain embodiments, the coating compositions of the present disclosure may include one or more optional ingredients (i.e., optional additives). Such optional ingredients are preferably selected to not adversely affect the coating composition or a hardened coating resulting therefrom. Such optional ingredients are typically included in a coating composition to enhance composition esthetics, to facilitate manufacturing, processing, handling, storage, and application of the composition, and to further improve a particular functional property of a coating composition or a hardened coating resulting therefrom.

Each optional ingredient is included in a sufficient amount to serve its intended purpose, but not in such an amount to adversely affect a coating composition or a hardened coating resulting therefrom. The amounts of such optional ingredient can be determined readily by one of skill in the art.

Examples of suitable optional ingredients include catalysts, dyes, pigments (e.g., $TiO_2$, carbon black), anti-staining agents (e.g., ZnO), toners, extenders, fillers (inorganic or organic), lubricants, anticorrosion agents, defoamers, coalescents, flow-control agents, rheology modifiers, thixotropic agents, dispersing agents (e.g., wax dispersants), antioxidants, biocides, fungicides, adhesion promoters, light stabilizers, curing agents, flatting agents, and mar and abrasion additives, surfactants (i.e., wetting agents), or mixtures thereof. Preferred optional additives include surfactants, defoamers, coalescents, biocides, and rheology modifiers.

If pigments and/or inorganic fillers are used, they are used in an amount so as not to adversely impact the visual transparency of the coating. Typically, no more than 5 wt-%, or no more than 1 wt-%, if any, of a pigment or inorganic filler is used. In some embodiments, the coating composition may have a color, yet be transparent or translucent. Preferably, the coating composition is a clear coating composition.

The coating compositions may include a surfactant that modifies the interaction of the coating composition with the substrate or with a prior applied coating (e.g., primer coating). The surfactant affects qualities of the composition including how the composition is handled, how it spreads across the surface of the substrate, and how it bonds to the substrate. In particular, the agent can modify the ability of the composition to wet a substrate. Surfactants may also provide leveling, defoaming or flow control properties, and the like.

Suitable surfactants may be polymeric or small molecule surfactants (i.e., low molecular weight surfactants). Exemplary surfactants include those available under the trade designations SURFYNOL PSA-336, SURFYNOL 420, SURFYNOL 440, ENVIROGEM AD-01 and ENVIROGEM AE01 from Evonik in Essen, Germany; TAMOL 1124, TAMOL 850, TAMOL 681, TAMOL 731 and TAMOL SG-1 from Dow in Midland, MI; IGEPAL CO-210, IGEPAL CO-430, IGEPAL CO-630, IGEPAL CO-730, and IGEPAL CO-890 from Solvay in Brussels, Belgium; T-DET and T-MULZ from Harcros Chemicals in Kansas City, KS; polydimethylsiloxane surface-active agents (such as those available under the trade designations SILWET L-760 and SILWET L-7622 from Momentive in Niskayuna, NY; or BYK 306 from Byk in Wesel, Germany) and fluorinated surface-active agents (such as that commercially available as FLUORAD FC-430 from 3M Co., St. Paul, MN). Various combinations of surfactants may be used if desired.

If it is used, a surfactant is preferably present in an amount of at least 0.1 wt-%, based on the total weight of the coating composition. In some embodiments, a surfactant is preferably present in an amount of no more than 3 wt-%, based on the total weight of the coating composition.

Exemplary defoamers include BYK 018, BYK 019, BYK 020, BYK 022, BYK 025, BYK 032, BYK 033, BYK 034, BYK 038, BYK 040, BYK 051, BYK 060, BYK 070, BYK 077 and BYK 500 from Byk; SURFYNOL DF-695, SURFYNOL DF-75, SURFYNOL DF-62, SURFYNOL DF-40 and SURFYNOL DF-110D from Evonik in Essen, Germany; DEEFO 3010A, DEEFO 2020E/50, DEEFO 215, DEEFO 806-102 and AGITAN 31BP from Munzig Chemie in Abstatt, Germany; FOAMAX 8050, FOAMAX 1488. FOAMAX 7447, FOAMAX 800, FOAMAX 1495 and FOAMAX 810 from Evonik in Essen, Germany; FOAMASTER 714, FOAMASTER A410, FOAMASTER 111, FOAMASTER 333, FOAMASTER 306, FOAMASTER SA-3, FOAMASTER AP, DEHYDRAN 1620, DEHYDRAN 1923 and DEHYDRAN 671 from BASF in Ludwigshafen, Germany. Various combinations of defoamers may be used if desired If it is used, a defoamer is preferably present in an amount of at least 0.1 wt-%, based on the total weight of the coating composition. In some embodiments, a defoamer is preferably present in an amount of no more than 1 wt-%, based on the total weight of the coating composition.

The coating compositions may include a coalescent to facilitate film formation. Exemplary coalescents include glycol ethers such as those available under the trade names EASTMAN EP, EASTMAN DM, EASTMAN DE, EASTMAN DP, EASTMAN DB and EASTMAN PM from Eastman Chemical Co, OPTIFILM 400 from Eastman Chemical Co., and ester alcohols such as TEXANOL ester alcohol from Eastman Chemical Co. In certain embodiments, the optional coalescent is a low VOC coalescent such as that available under the trade name EPS 9147 from Engineered Polymer Solutions (EPS), Marengo, IL, and as is described in U.S. Pat. No. 6,762,230 B2 (Brandenburger et al.) and U.S. Pat. No. 7,812,079 (Brandenburger et al.). Various combinations of coalescents may be used if desired.

In certain embodiments, the coating composition is substantially free of a high VOC coalescent. In certain embodiments, one or more low VOC coalescents are used in the coating composition.

The term "substantially free," when applied to components of a composition and not to VOC levels, means that the compositions of the present invention contain no more than about 5 wt % of a particular component, based on total weight of solids in the composition. For example, a composition of the present invention that is substantially free of a high VOC coalescent contains no more than about 5 wt % coalescent. A composition of the present invention that is "essentially free" of a high VOC coalescent contains no more than about 0.5 wt % of coalescent.

If it is used, a coalescent is preferably present in an amount of at least 0.5 wt-%, at least 1 wt-%, or at least about 2 wt-%, based on the total weight of the coating composition. The coating compositions also preferably include a coalescent in an amount of no more than 10 wt-%, no more than 6 wt-%, or no more than 4 wt-%, based on the weight of the coating composition. Preferably, the coalescent is a low VOC coalescent.

The coating compositions may include a biocide, a fungicide, or a combination thereof. Exemplary biocides or fungicides include ROZONE 2000, BUSAN 1292, and BUSAN 1440 from Buckman Laboratories of Memphis, TN; POLYPHASE 663 and POLYPHASE 678 from Troy Chemical Corp. of Florham Park, NJ; and KATHON LX from Rohm and Haas Co.

If it is used, a biocide and/or a fungicide is preferably present in an amount of at least 0.1 wt-%, based on the total weight of the coating composition. In some embodiments, a biocide and/or a fungicide is preferably present in an amount of no more than 2 wt-%, based on the total weight of the coating composition. Various combinations of biocides and/or fungicides may be used if desired.

The coating compositions may include rheology modifiers. Exemplary rheology modifiers include RHEOVIS 112, RHEOVIS 132, RHEOVIS 152, VISCALEX HV30, VISCALEX ATSS, EFKA 6220 and EFKA 6225 from BASF in Ludwigshafen, Germany; BYK 420 and BYK 425 from Byk in Wesel, Germany; RHEOLATE 205, RHEOLATE 420, and RHEOLATE 1 from Elementis in London, UK; ACRYSOL L TT-615, ACRYSOL RM-5, ACRYSOL RM-6. ACRYSOL RM-8W, ACRYSOL RM-2020 and ACRYSOL RM-825 from Dow in Midland, MI; NATROSOL 250LR from Ashland in Wilmington, DE; and CELLOSIZE QP09L from Dow in Midland, MI. Various combinations of rheology modifiers may be used if desired.

A rheology modifier need not be used. If it is used, however, a rheology modifier is preferably present in an amount of at least 0.1 wt-%, based on the total weight of the coating composition. In some embodiments, a rheology modifier is preferably present in an amount of no more than 3 wt-%, based on the total weight of the coating composition.

Methods of Use and Articles

In one aspect, the coating compositions described herein are water-based sealants for cementitious surfaces or substrates intended to provide a wet look when the composition is dried. In another aspect, the coating composition described herein is a wet-look sealer for a cementitious surface, such as concrete.

Hardened coatings of the disclosure preferably adhere well to cementitious substrates. The present disclosure provides articles that include coated cementitious substrates (e.g., walls, ceilings, doors, trim, floors, driveways, walkways, etc.). In certain embodiments, a cementitious substrate comprises a pre-treated (e.g., acid-etched or otherwise cleaned) substrate.

In one embodiment, a method of coating a cementitious substrate includes providing a wet look coating composition as described herein; applying the coating composition to at least a portion of a cementitious substrate; and allowing the coating composition to harden (e.g., dry, water and/or other solvents to evaporate) to form a hardened coating disposed on the cementitious substrate.

In another embodiment, a method of coating a cementitious substrate includes providing a wet look coating composition as described herein; causing the coating composition to be applied to at least a portion of a cementitious substrate; and allowing the coating composition to form a hardened coating (e.g., by allowing water and other solvents to evaporate).

The coating compositions described herein may be applied to one or more surfaces by conventional methods known to those of skill in the art. Suitable examples include, without limitation, application by aerosol spray, brush, roller, airless spray, air-assisted spray, high volume low pressure (HVLP) spray, flood coating using an air knife system, and the like.

For field applied coating systems, e.g., cement garage floors, floor tiles, decks, etc. it is common to apply the coating by roll, spray, or brush. For factory-applied applications (e.g, for application to pavers, stepping stones, retaining wall blocks or other porous cementitious-type articles), preferred application methods provide a uniform coating thickness and are cost efficient. Especially preferred application methods employ factory equipment that moves the substrate past a coating bead and thence past suitable drying or curing equipment. The coating composition covers at least a portion of the first major surface of the board, and desirably covers the entire first major surface, in a substantially uniformly thick layer.

The coating compositions described herein have the desirable properties of a conventional solution acrylic composition, with the added advantage of being a water-based composition. These properties include ease of application, fast dry times, good hardness, dirt pick-up resistance, early water resistance, blush resistance, and durability. The coating composition also demonstrates optimal flow and leveling, high gloss and optimal penetration into a porous substrate.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, MO; Hexion, Columbus, OH; SBHPP, Novi, MI; Allnex, Kalamazoo, MI; Dow, Midland, MI; or may be synthesized by conventional methods. The following abbreviations may be used in the following examples: Mn=number average molecular weight; ppm=parts per million; mL=milliliter; L=liter; m=meter, mm=millimeter, cm=centimeter, µm=micrometer, kg=kilogram, g=gram, min=minute, s=second, h=hour, ° C.=degrees Celsius, ° F.=degrees fahrenheit, MPa=megapascals, and N-m=Newton-meter, Mn=number average molecular weight, cps=centipoise.

In the following Examples, all glass transition temperatures were measured by DSC, and particle size was determined using Microtrac Nanotrac Wave II Particle Size Analyzer.

Table 1 is a materials table giving a list of monomers and their associated acronyms, molecular weights, homopolymer Tg value, and vendor source for various monomers used in the Examples, as well as other agents used in the Examples.

TABLE 1

MATERIALS

| Material Name | Ingredient of Property (Function) | Source |
|---|---|---|
| DI Water | De-ionized water (Continuous Phase) | MilliporeSigma in Burlington, MA |
| Latex Seed | A styrene acrylate polymer with a solids content of 30 wt-% and particle size of 35 nm made by emulsion polymerization with an anionic surfactant (Seed Polymer) | EPS in Marengo, IL |
| DISPONIL FES 27A | Sodium lauryl ether sulfate (Anionic Sulfate Emulsifier/Surfactant) | BASF Corporation in Florham Park, NJ |
| Methacrylic Acid | $T_g = 185°$ C. (Monomer) | MilliporeSigma in Burlington, MA |
| n-Butyl Acrylate | $T_g = -54°$ C. (Monomer) | BASF Corporation in Florham Park, NJ |
| n-Butyl Methacrylate | $T_g = 20°$ C. (Monomer) | BASF Corporation in Florham Park, NJ |
| Methyl Methacrylate | $T_g = 105°$ C. (Monomer) | MilliporeSigma in Burlington, MA |
| Diacetone Acrylamide (DAAM) | $T_g = 65°$ C. (Monomer) | KH Neochem Co., Ltd. (USA) in Schaumburg, IL |
| Allyl Ureido Monomer | $T_g = 105°$ C. (Monomer) | EPS in Marengo, IL |
| SIPOMER PAM 4000 | 2-(Methacryloxy)ethyl Phosphate 2-Hydroxyethyl Methacrylate $T_g = 55°$ C. (Monomer) | Solvay in Alpharetta, Georgia |
| 1-Dodecanethiol | Chain Transfer Agent | Arkema |
| Ammonium hydroxide | 30 wt-% active ammonia (Volatile Base) | Viking Chemical Company in Rockford, IL |
| t-Butyl Hydroperoxide | Initiation Oxidizing Agent | United Initiators in Elyria, OH |
| BRUGGOLITE FF6 | Formaldehyde-Free Sulfur-Based Initiation Reducer | Bruggemann Chemical in Heilbronn, Germany |
| Iron Catalyst Solution | Initiation Catalyst | Brenntag in Essen, Germany |

TABLE 1-continued

MATERIALS

| Material Name | Ingredient of Property (Function) | Source |
|---|---|---|
| Adipic Dihydrazide | DAAM Crosslinker | Novasol North America Inc in Burlington, ON |
| PROXEL AQ | Benzisothiazolinone (Biocide) | Lonza in Basel, Switzerland |
| Ammonium Persulfate | Initiation Oxidizing Agent | United Initiators in Elyria, OH |
| Acetoacetoxyethyl Methacrylate (AAEM) | $T_g = 7°$ C. (Monomer) | Arxada in Basel, Switzerland |
| ACTICIDE MV | Mixture of 5-chloro-2-methyl-4-isothiazolin-3-one (1.11%) and 2-methyl-4-isothiazolin-3-one (0.37%) (Biocide) | Thor Group in Wincham, UK |
| AQUAFLOW NHS-310 | Hydrophobically modified polyether, 20 wt-% aqueous dispersion (Non-ionic associative Thickener) | Ashland Inc. in Covington, KY |
| ACRYSOL RM-8W | Hydrophobically modified ethylene oxide urethane, 18 wt-% aqueous dispersion (Rheology Modifier) | Dow Chemical in Midland, MI |
| EPS 9147 | (Low VOC Coalescent; proprietary composition) | Engineered Polymer Solutions in Marengo, IL |
| Erythorbic Acid | Erythorbic Acid FCC | Brenntag Great Lakes, Inc., Wauwatosa, WI |
| 30% Ammonia Solution | Ammonia in water | Viking Chemical, Rockford, IL |
| Aromatic 100 | Naphtha solvent | ExxonMobile |

Theoretical Fox Tg Calculation

The Glass Transition Temperature (Tg) of the disclosed polymer composition is predicted from the Fox Equation, a generalized form of which is shown below:

$$Tg = \left(\frac{W_A}{Tg_A} + \frac{W_B}{Tg_B} + \frac{W_C}{Tg_C} + \ldots + \frac{W_N}{Tg_N}\right)^{-1},$$

where $W_A$, $W_B$, $W_C$, ..., $W_N$ respectively represent the weight fraction of each monomer type A, B, C, ..., N in the copolymer composition, and $Tg_A$, $Tg_B$, $Tg_C$, ..., $Tg$ represent the corresponding Tg's (expressed in Kelvin) of the homopolymers prepared from the respective monomer type A, B, C, ..., N. For example, a polymer composition consisting of 55.8 wt-% styrene (Tg, styrene=373.15K), 42.8 wt-% 2-ethylhexyl acrylate (Tg, 2-EHA=193.15 K), and 1.4 wt-% methacrylic acid (Tg, MAA=458.15) will have a predicted Fox Tg of $$Tg = \left[\frac{0.558}{373.15K} + \frac{0.428}{193.15K} + \frac{0.014}{458.15K}\right]^{-1} = 267.25K,$$

or equivalently, −5.9° C.

The Fox equation is also known to adequately predict the effective overall Tg of a miscible polymer mixture. In the case of a multistage polymer blend, the overall Tg of the polymer blend can be determined by applying the Tg and weight fraction of each polymer stage in the Fox equation.

Actual Tg

The actual Tg of a polymer or polymer blend can determined experimentally by techniques such as differential scanning calorimetry (DSC). All actual Tg disclosed in the current disclosure were evaluated using a DSC25 differential scanning calorimeter equipped with a RCS90 cooler, both purchased from TA Instruments. Calibration was performed on an indium standard and all experiments use a standardized heat-cool-heat cycle at a 20° C./min ramp rate.

Wet Look Test

A 15.24 cm×15.24 cm block of concrete (product name "Block 661 EPS" purchased from "Doty and Sons Concrete" in Sycamore, IL) was acid etched and cleaned with "Rustoleum Rock Solid Efflorescence Remover" (Rustoleum in Vernon Hills, IL). It was then divided into four 7.62 cm×7.62 cm sections. One section was left blank with no coating, one had a sealer applied that included 50 wt-% styrene-ethyl hexyl methacrylate copolymer (referred to herein as styrene-EHMA copolymer) (a 50% solids by weight of an organic solution polymerized copolymer of styrene and 2-ethylhexyl methacrylate solvated in Aromatic 100, wherein the styrene content is 80 wt % based on resin solids, and the 2-ethylhexyl methacrylate is 20% based on resin solids; the number average molecular weight (Mn) is approximately 7900 g/mol and the weight average molecular weight (Mw) is 84,000 g/mol) and 50 wt-% Aromatic 100 (this is a high VOC solution acrylic coating used as a control). Two separate samples were applied to the last two sections. All samples were applied in two coats at 300 square foot per gallon, with the coats applied 4 hours apart. The block was allowed to cure overnight (between 8-12 hours at 20° C. and 55% relative humidity). Delta E (dE) values were measured according to ASTM D2244-16, equation 05. dE values were taken (with a Datacolor Check 3 Spectrophotometer) of the samples and the styrene-EHMA copolymer control formula with the blank section being utilized as the standard to which the dE value for each sample was calculated. A sample's dE value was then divided by the solution acrylic coating styrene-EHMA copolymer dE value to calculate the "% wet look."

Blushing Test

Two coats of a sample were applied at 300 square foot per gallon 4 hours apart to black glass and cured overnight (between 8-12 hours at 20° C. and 55% relative humidity). The sample was then submerged into a room temperature water bath in a white plastic tub and digital photos were taken immediately of the samples before any blushing could onset, and then at 6- and 12-hour intervals after submersion. Using image analysis software (ImageJ from National Institutes of Health in Bethesda, MD), 5 random points on the image of a sample have a mean grey value calculated and these were averaged together. The 6-hour and 12-hour mean grey values were both subtracted from the initial mean grey value. Those values were both divided by the mean grey value of the white plastic tub in the photo (used as a background standard with a CIE Lab of 83.19/−1.81, −4.36) to get both a 6-hour and 12-hour "% Blushing."

Latex Examples

All latex examples were synthesized according to the following general method with the components and amounts (parts are in grams) listed in the following Tables 2a-2c. Note that some of the components are not included in some of the latex examples.

A reactor was charged with deionized water and pre-formed latex seed. The reaction mixture was heated to a temperature of 70° C. with agitation.

A primary emulsion was formed having deionized water, emulsifier (DISPONIL FES 27A), diacetone acrylamide (DAAM) or acetoacetoxyethyl methacrylate (AAEM), allyl ureido monomer, phosphorus-functional monomer (SIPOMER PAM 4000), methacrylic acid, n-butyl acrylate, and methyl methacrylate.

A secondary emulsion was formed having deionized water, emulsifier (DISPONIL FES 27A), allyl ureido monomer, phosphorus-functional monomer (SIPOMER PAM 4000), methacrylic acid, n-butyl acrylate, n-butyl methacrylate, and chain-transfer agent (1-dodecanethiol).

Once reactor reached a temperature of 70° C., the initial initiator was added to the reactor and then the initiator co-feed was added over a 4-hour period. The primary emulsion was added over a 1-hour period. After the primary emulsion (i.e., first stage) was added, the secondary emulsion (i.e., second stage) was added over a 2-hour period. The temperature of the reaction was held at 70° C. to 75° C. during the polymerization.

After the secondary emulsion was added, the reaction was held at temperature while the initiator co-feed continued for 1-hour.

Once initiator system co-feed was complete, the reaction was cooled to 40° C. and 30% ammonia solution was added to adjust the pH to 9.3. Adipic dihydrazide was added to promote keto-hydrazide crosslinking.

In the final steps, a preservative was added and deionized water used to adjust to a target finished weight per volume.

The polymers in the following tables were made in a similar fashion, with the bulk monomer levels being adjusted to modify the Tg's of the stages.

TABLE 2a

| Sum of Wet Mass | Example | 1 | 2 | 3 | 4 | 5 |
|---|---|---|---|---|---|---|
| Initial Initiator | | | | | | |
| Ammonium Persulfate | | 2.7 | 2.7 | 2.7 | 2.7 | 2.7 |
| BRUGGOLITE FF6 | | 0 | 0 | 0 | 0 | 0 |
| DI Water | | 20 | 20 | 20 | 20 | 20 |
| Iron Catalyst Solution | | 0 | 0 | 0 | 0 | 0 |
| t-Butyl Hydroperoxide | | 0 | 0 | 0 | 0 | 0 |
| Initiator Cofeed | | | | | | |
| Ammonium Persulfate | | 0.9 | 0.9 | 0.9 | 0.9 | 0.9 |
| BRUGGOLITE FF6 | | 0 | 0 | 0 | 0 | 0 |
| DI Water | | 110.9 | 130 | 130 | 130 | 110 |
| Erythorbic Acid | | 0.9 | 0.9 | 0.9 | 0.9 | 0.9 |
| Iron Catalyst Solution | | 0.2 | 0.2 | 0.2 | 0.2 | 0.2 |
| t-Butyl Hydroperoxide | | 1.3 | 1.3 | 1.3 | 1.3 | 1.3 |
| M1 Emulsion | | | | | | |
| Acetoacetoxyethyl Methacrylate | | 0 | 0 | 0 | 0 | 0 |
| DI Water | | 75 | 75 | 75 | 75 | 75 |
| Diacetone Acrylamide | | 0 | 0 | 0 | 0 | 0 |
| DISPONIL FES 27A | | 13.1 | 9.8 | 9.8 | 11.4 | 13.1 |
| Methacrylic Acid | | 11 | 8.2 | 8.2 | 9.6 | 11 |
| Methyl Methacrylate | | 324.8 | 241.6 | 224.2 | 271.7 | 299.7 |
| Allyl Ureido Monomer | | 6.1 | 4.6 | 4.6 | 5.3 | 6.1 |
| n-Butyl Acrylate | | 18.3 | 16 | 33.4 | 28.8 | 43.7 |
| SIPOMER PAM 4000 | | 5.5 | 4.1 | 4.1 | 4.8 | 5.5 |
| M2 Emulsion | | | | | | |
| 1-Dodecanethiol | | 10.1 | 11.5 | 11.5 | 10.7 | 10.1 |
| DI Water | | 125 | 125 | 125 | 125 | 125 |
| Diacetone Acrylamide | | 0 | 0 | 0 | 0 | 0 |
| DISPONIL FES 27A | | 19.6 | 22.9 | 22.9 | 21.2 | 19.6 |
| Methacrylic Acid | | 16.5 | 19.2 | 19.2 | 17.8 | 16.5 |
| Allyl Ureido Monomer | | 9.2 | 10.7 | 10.7 | 9.9 | 9.2 |
| n-Butyl Acrylate | | 292.8 | 461.3 | 159.4 | 343.1 | 498.7 |
| n-Butyl Methacrylate | | 212.6 | 128.1 | 430.1 | 204.2 | 6.4 |
| SIPOMER PAM 4000 | | 8.2 | 9.6 | 9.6 | 8.9 | 8.2 |

TABLE 2a-continued

| Sum of Wet Mass | Example | 1 | 2 | 3 | 4 | 5 |
|---|---|---|---|---|---|---|
| Post-Add | | | | | | |
| 30% Ammonium Hydroxide | | 20 | 20 | 20 | 20 | 20 |
| Adipic Dihydrazide | | 0 | 0 | 0 | 0 | 0 |
| DI Water | | 115.8 | 95.8 | 95.8 | 115.8 | 115.8 |
| PROXEL AQ | | 11 | 11 | 11 | 11 | 11 |
| Reactor Charge | | | | | | |
| DI Water | | 800 | 800 | 800 | 800 | 800 |
| Latex Seed | | 152.5 | 152.5 | 152.5 | 152.5 | 152.5 |

TABLE 2b

| Sum of Wet Mass | Example | 6 | 7 | 8 | 9 | 10 |
|---|---|---|---|---|---|---|
| Initial Initiator | | | | | | |
| Ammonium Persulfate | | 2.5 | 0 | 0 | 0 | 0 |
| BRUGGOLITE FF6 | | 0 | 0.5 | 0.5 | 0.5 | 0.5 |
| DI Water | | 18.3 | 13.7 | 13.7 | 13.7 | 13.7 |
| Iron Catalyst Solution | | 0 | 0.2 | 0.2 | 0.2 | 0.2 |
| t-Butyl Hydroperoxide | | 0 | 0.5 | 0.5 | 0.5 | 0.5 |
| Initiator Cofeed | | | | | | |
| Ammonium Persulfate | | 0.8 | 0 | 0 | 0 | 0 |
| BRUGGOLITE FF6 | | 0 | 2.1 | 2.5 | 2.5 | 2.5 |
| DI Water | | 104.3 | 164.8 | 164.6 | 183 | 183 |
| Erythorbic Acid | | 0.8 | 0 | 0 | 0 | 0 |
| Iron Catalyst Solution | | 0.2 | 0 | 0 | 0 | 0 |
| t-Butyl Hydroperoxide | | 1.2 | 3 | 3.6 | 3.6 | 3.6 |
| M1 Emulsion | | | | | | |
| Acetoacetoxyethyl Methacrylate | | 0 | 0 | 0 | 0 | 0 |
| DI Water | | 68.7 | 82.4 | 51.5 | 102.9 | 85.8 |
| Diacetone Acrylamide | | 0 | 0 | 0 | 0 | 0 |
| DISPONIL FES 27A | | 12 | 12 | 9 | 18 | 15 |
| Methacrylic Acid | | 10.1 | 10.1 | 7.5 | 15.1 | 12.6 |
| Methyl Methacrylate | | 274.4 | 274.3 | 205.6 | 270.9 | 273.7 |
| Allyl Ureido Monomer | | 5.6 | 5.6 | 4.2 | 8.4 | 7 |
| n-Butyl Acrylate | | 40 | 40 | 30 | 200.3 | 118.9 |
| SIPOMER PAM 4000 | | 5 | 5 | 3.8 | 7.5 | 6.3 |
| M2 Emulsion | | | | | | |
| 1-Dodecanethiol | | 9.2 | 9.2 | 10.8 | 6.2 | 7.7 |
| DI Water | | 114.4 | 114.4 | 133.4 | 76.2 | 95.3 |
| Diacetone Acrylamide | | 0 | 0 | 0 | 0 | 0 |
| DISPONIL FES 27A | | 17.9 | 17.9 | 20.9 | 12 | 14.9 |
| Methacrylic Acid | | 15.1 | 15.1 | 17.6 | 10.1 | 12.6 |
| Allyl Ureido Monomer | | 8.4 | 8.4 | 9.8 | 5.6 | 7 |
| n-Butyl Acrylate | | 456.6 | 456.4 | 416.2 | 301.9 | 379.6 |
| n-Butyl Methacrylate | | 5.9 | 5.9 | 122.8 | 6.2 | 5.4 |
| SIPOMER PAM 4000 | | 7.5 | 7.5 | 8.8 | 5 | 6.3 |
| Post-Add | | | | | | |
| 30% Ammonium Hydroxide | | 18.3 | 18.3 | 18.3 | 18.3 | 18.3 |
| Adipic Dihydrazide | | 0 | 0 | 0 | 0 | 0 |
| DI Water | | 120.7 | 83.1 | 94.9 | 82.3 | 80.4 |
| PROXEL AQ | | 10.1 | 10.1 | 10.1 | 10.1 | 10.1 |
| Reactor Charge | | | | | | |
| DI Water | | 732.4 | 700.1 | 699.8 | 699.8 | 699.8 |
| Latex Seed | | 139.6 | 139.6 | 139.5 | 139.5 | 139.5 |

TABLE 2c

| Sum of Wet Mass | Example 11 | 12 | 13 | 14 | 15 | 16 |
|---|---|---|---|---|---|---|
| Initial Initiator | | | | | | |
| Ammonium Persulfate | 0 | 0 | 0 | 0 | 0 | 0 |
| BRUGGOLITE FF6 | 0.4 | 0.4 | 0.4 | 0.5 | 0.5 | 0.5 |
| DI Water | 13.5 | 13.5 | 13.5 | 13.5 | 13.6 | 13.4 |
| Iron Catalyst Solution | 0.2 | 0.2 | 0.2 | 0.2 | 0.2 | 0.2 |
| t-Butyl Hydroperoxide | 0.5 | 0.5 | 0.5 | 0.5 | 0.5 | 0.5 |
| Initiator Cofeed | | | | | | |
| Ammonium Persulfate | 0 | 0 | 0 | 0 | 0 | 0 |
| BRUGGOLITE FF6 | 2.4 | 2.4 | 2.4 | 2.4 | 2.5 | 2.4 |
| DI Water | 180 | 180 | 180 | 180.2 | 181.8 | 179 |
| Erythorbic Acid | 0 | 0 | 0 | 0 | 0 | 0 |
| Iron Catalyst Solution | 0 | 0 | 0 | 0 | 0 | 0 |
| t-Butyl Hydroperoxide | 3.5 | 3.5 | 3.5 | 3.5 | 3.5 | 3.5 |
| M1 Emulsion | | | | | | |
| Acetoacetoxyethyl Methacrylate | 0 | 0 | 0 | 33.9 | 0 | 0 |
| DI Water | 50.6 | 50.6 | 50.6 | 50.7 | 50.3 | 50.3 |
| Diacetone Acrylamide | 9 | 0 | 27 | 0 | 10.9 | 35.8 |
| DISPONIL FES 27A | 8.8 | 8.8 | 8.8 | 8.9 | 8.9 | 8.8 |
| Methacrylic Acid | 7.4 | 7.4 | 7.4 | 7.4 | 7.5 | 7.4 |
| Methyl Methacrylate | 202.3 | 202.3 | 202.3 | 202.6 | 204.4 | 201.1 |
| Allyl Ureido Monomer | 4.1 | 4.1 | 4.1 | 4.1 | 4.2 | 4.1 |
| n-Butyl Acrylate | 29.5 | 29.5 | 29.5 | 29.5 | 29.8 | 29.3 |
| SIPOMER PAM 4000 | 3.7 | 3.7 | 3.7 | 3.7 | 3.8 | 3.7 |
| M2 Emulsion | | | | | | |
| 1-Dodecanethiol | 10.6 | 10.6 | 10.6 | 10.6 | 10.7 | 10.5 |
| DI Water | 131.2 | 131.2 | 131.2 | 131.5 | 132.6 | 130.5 |
| Diacetone Acrylamide | 18 | 27 | 0 | 0 | 0 | 0 |
| DISPONIL FES 27A | 20.6 | 20.6 | 20.6 | 20.6 | 20.8 | 20.5 |
| Methacrylic Acid | 17.3 | 17.3 | 17.3 | 17.4 | 17.5 | 17.2 |
| Allyl Ureido Monomer | 9.7 | 9.7 | 9.7 | 9.7 | 9.8 | 9.6 |
| n-Butyl Acrylate | 409.4 | 409.4 | 409.4 | 410.1 | 413.7 | 407.1 |
| n-Butyl Methacrylate | 120.8 | 120.8 | 120.8 | 121 | 122.1 | 120.1 |
| SIPOMER PAM 4000 | 8.6 | 8.6 | 8.6 | 8.6 | 8.7 | 8.6 |
| Post-Add | 10.6 | 10.6 | 10.6 | 10.6 | 10.7 | 10.5 |
| 30% Ammonium Hydroxide | 16.2 | 16.2 | 16.2 | 16.2 | 16.4 | 16.1 |
| Adipic Dihydrazide | 10.8 | 10.8 | 10.8 | 0 | 4.4 | 14.3 |
| DI Water | 75.3 | 75.3 | 75.3 | 75.5 | 76.1 | 74.9 |
| PROXEL AQ | 9.9 | 9.9 | 9.9 | 9.9 | 10 | 9.8 |
| Reactor Charge | | | | | | |
| DI Water | 688.3 | 688.3 | 688.3 | 689.6 | 684.4 | 684.4 |
| Latex Seed | 137.2 | 137.2 | 137.2 | 137.5 | 136.4 | 136.4 |

Comparative Example 1 Latex Dispersion

Comparative Example 1 (U.S. Pat. No. 7,812,090, Example 3) is a standard waterborne acrylic emulsion. This is used as a comparative control, and it is shown to have very poor wet look (16.29%). This is a 2-stage resin utilizing acetoacetoxyethyl methacrylate (AAEM) as the self-crosslinker, with no chain transfer agent. The overall Fox Tg of the composition is also higher than the current invention.

Example Coating Composition

The coating compositions were prepared for use in the Wet Look Test and the Blushing Test. All latex polymers were formulated into the following wet look coating formulation: 215 grams (g) (solids) of wet look polymer; 278 g Water; 3 g SURFYNOL PSA 336 (acetylenic based formulated surfactant from Evonik in Essen, Germany); 3 g BYK 024 (silicone-containing defoamer from Byk in Wesel, Germany); 11 g EPS 9147 (low VOC coalescent from EPS in Marengo, IL); 5 g Acticide MV (CMT/MIT containing biocide from Thor in Wincham, UK); and 3 g ACRYSOL RM-8W (HEUR rheology modifier from DOW in Midland, MI). The order of addition was the same as the order listed. The compositions were tested using the Wet Look and Blushing Tests. The results are presented in the following tables.

TABLE 3

Comparing M1 (First Stage; Core) DAAM to M2 (Second Stage; Shell) DAAM

| Polymer Example | Total % DAAM | Total % AAEM | Average of % Wet Look | Average of 12-hour % Blushing | Analysis |
|---|---|---|---|---|---|
| 8 | 0 | 0 | 70.58 | 14.45 | No DAAM = poor blushing |
| 11 | 0.03 | 0 | 36.16 | 40.57 | DAAM in both stages = poor blushing & wet look |
| 12 | 0.03 | 0 | 28.04 | 8.46 | DAAM in 2nd stage = poor wet look |
| 13 | 0.03 | 0 | 58.51 | 10.65 | DAAM in 1st stage = good wet look & good blushing |
| 16 | 0.05 | 0 | 58.58 | 6.5 | DAAM in 1st stage = good wet look & good blushing |
| 15 | 0.01 | 0 | 58.92 | 7.42 | DAAM in 1st stage = good wet look & good blushing |

TABLE 4

Comparing M1 DAAM to M1 AAEM

| Polymer Example | % M1 DAAM | % M1 AAEM | Average of % Wet Look | Average of 12-hour % Blushing | Analysis |
|---|---|---|---|---|---|
| 8 | 0 | 0 | 70.58 | 14.45 | Blank = poor blushing |
| 13 | 0.03 | 0 | 58.51 | 10.65 | M1 DAAM = good blushing |
| 14 | 0 | 0.04 | 53.6 | 15.12 | M1 AAEM = poor blushing (equal to blank) |

TABLE 5

M1 Tg Effect on Blushing

| Polymer Example | M1 Fox Tg | M2 Fox Tg | M1 Stage % | Overall Fox Tg | Total % DAAM | Sum of % Wet Look | Sum of 12-hour % Blushing | Analysis All 3 have the same overall Fox Tg and M2 Fox Tg |
|---|---|---|---|---|---|---|---|---|
| 7 | 75.5 | −50 | 40 | −11.9 | 0 | 73.64 | 21.23 | |
| 10 | 40.6 | −50 | 50 | −11.8 | 0 | 44.67 | 46.59 | Reducing M1 Tg (from 75.5 to 40.6) and blushing resistance despite the amount of hard stage increasing |
| 9 | 20.1 | −49.6 | 60 | −11.9 | 0 | 26.5 | 60.33 | Trend continues when M1 Tg is further reduced (from 40.6 to 20.1) |

TABLE 6

Overall Tg Effect on Wet Look

| Polymer Example | M1 Fox Tg | M1 Stage % | Overall Fox Tg | Total % DAAM | Sum of % Wet Look | Sum of 12-hour % Blushing |
|---|---|---|---|---|---|---|
| 1 | 90 | 40 | 20.4 | 0 | 13.03 | 0 |
| 2 | 90 | 30 | 0.3 | 0 | 28.61 | 3.6 |
| 3 | 75 | 30 | 19.7 | 0 | 8.88 | 3.49 |
| 4 | 82.5 | 35 | 10.03 | 0 | 14.22 | 3.08 |
| 5 | 75 | 40 | −11.9 | 0 | 23.47 | 3.5 |
| 6 | 75.5 | 40 | −11.9 | 0 | 16.25 | 5.13 |

The dataset in Table 6 makes up a factorial that was used to analyze effects of M1 Tg, Overall Tg, and Stage Ratio had on Wet Look % Overall Tg was a main effect and the only significant factor.

TABLE 7

General Architectural Polymer vs Prototype

| Polymer Example | Average of % Wet Look | Average of 12-hour % Blushing |
|---|---|---|
| Comparative Example 1 | 16.29 | 0.75 |
| 15 | 58.92 | 7.42 |

Figure 1A:
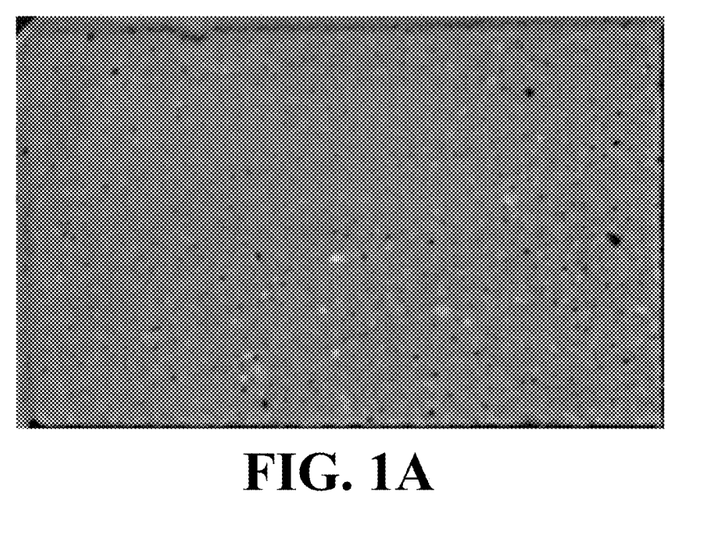
FIGS. 1A-1F are photographs of 3 inch×2 inch sections of an etched 6 inch×6 inch concrete block having different compositions applied thereto.
Figure 1B:
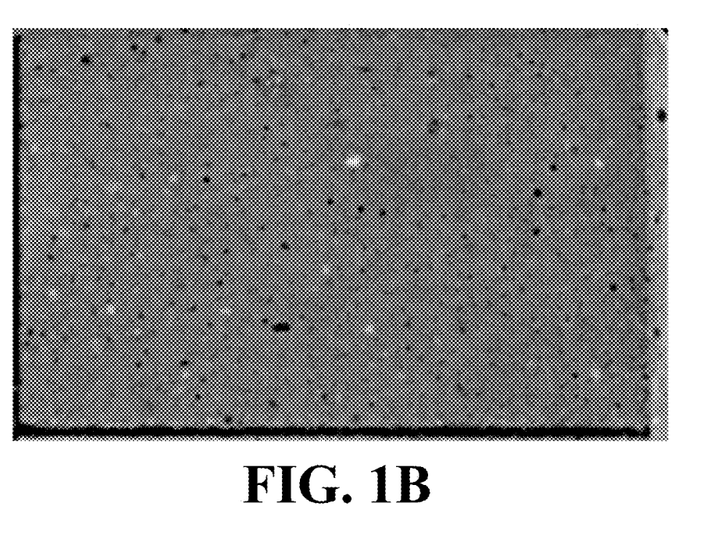
Figure 1C:
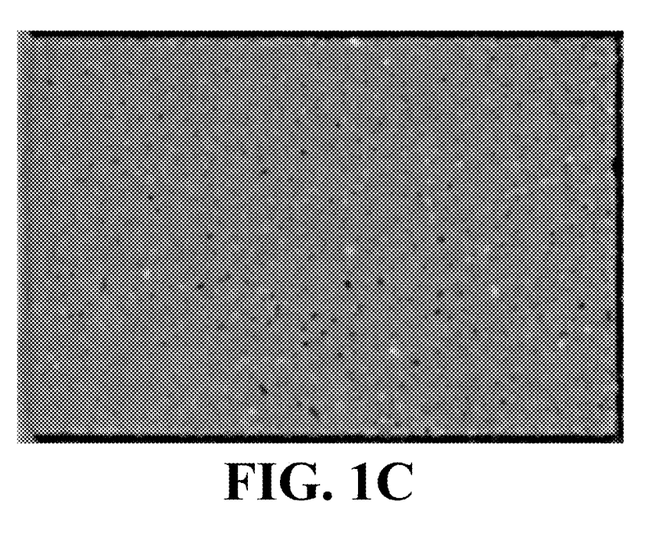
Figure 1D:
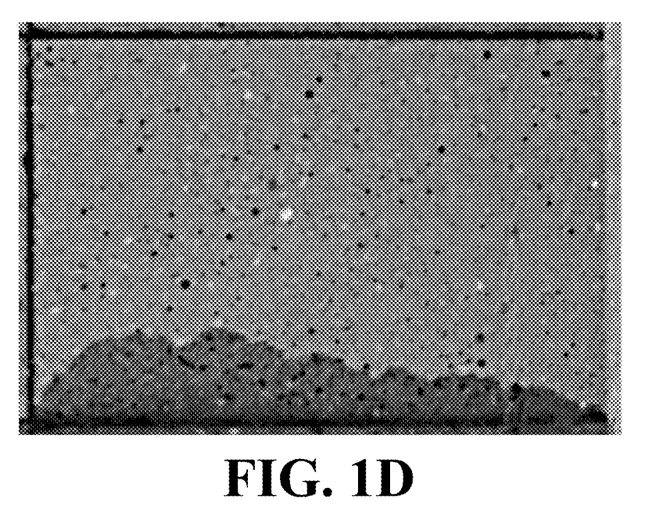
Figure 1E:
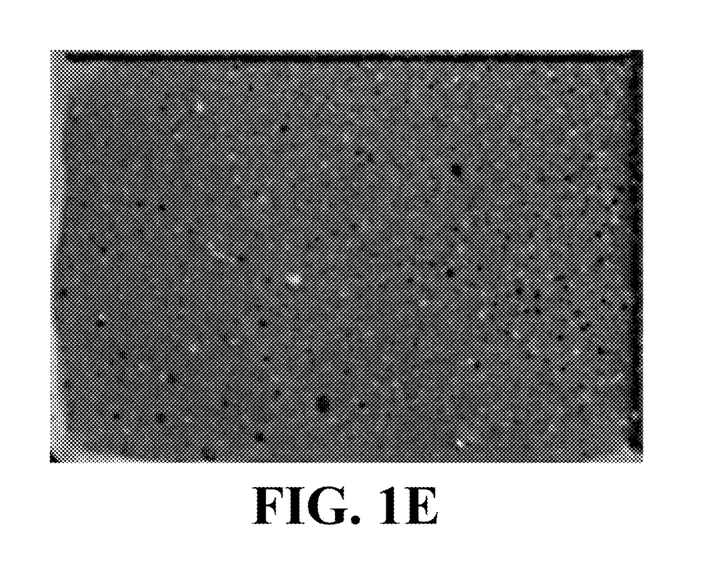
Figure 1F:
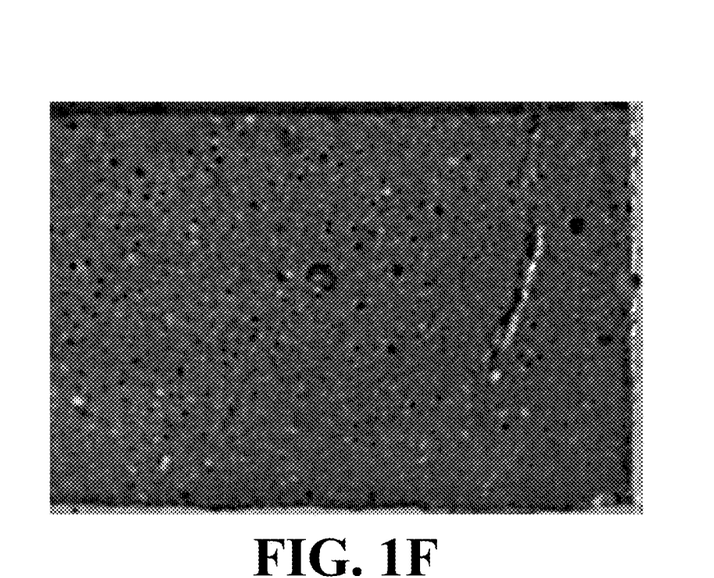

FIG. 1 is a photograph of an etched 6 inch×6 inch concrete block split into six 3 inch×2 inch sections having different compositions applied thereto. FIG. 1A (upper left) is a composition containing a conventional multistage differential-Tg latex with 0.25% CTA added to attempt to enhance wet look. FIG. 1B (upper right) is a composition containing Polymer Example 15. FIG. 1C (middle left) is the commercial Behr Wet Look Sealer. FIG. 1D (middle right) has no coating applied (except for slight bleed from section 1F). FIG. 1E (bottom left) had water applied shortly before the photo was taken. FIG. 1F (bottom right) is a composition containing the styrene-EHMA copolymer (a solution acrylic) referred to in the Wet Look Test. All sections of the concrete block that had compositions (e.g., sealers) applied thereto had 2 coats applied 4 hours apart at a 300 square foot per gallon spread rate.

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method of coating a cementitious substrate, the method comprising:
   causing a wet look coating composition to be applied to at least a portion of the cementitious substrate to provide a hardened wet look coating, the coating composition comprising:
      a multistage latex polymer comprising an emulsion polymerized first stage and an emulsion polymerized second stage; wherein the multistage latex polymer has an overall Fox equation Tg of at most 5° C. and comprises:
         interpolymerized monomers comprising diacetone acrylamide (DAAM); and
         at least one stage having a measured Tg of at least 60° C.;
      wherein the composition comprises less than 100 g VOC/L, according to ASTM D6886-2018.

2. The method of claim 1, wherein the multistage latex polymer comprises core-shell polymer particles.

3. The method of claim 2, wherein the DAAM is in the core of the core-shell polymer particles.

4. A method of coating a cementitious substrate, the method comprising:
   causing a wet look coating composition to be applied to at least a portion of the cementitious substrate to provide a hardened wet look coating, the coating composition comprising:
      a multistage latex polymer comprising an emulsion polymerized first stage and an emulsion polymerized second stage;
      wherein the multistage latex polymer comprises:
         interpolymerized monomers comprising diacetone acrylamide (DAAM);
         at least one stage having a measured Tg of at least 60° C.; and
         core-shell polymer particles, wherein a chain transfer agent is in the shell of the core-shell polymer particles;
      wherein the composition comprises less than 100 g VOC/L, according to ASTM D6886-2018.

5. The method of claim 2, wherein the core of the core-shell polymer particles has a measured Tg of at least 60° C.

6. The method of claim 1, wherein the multistage latex polymer comprises at least 0.5 wt-% of DAAM, based on the total weight of the interpolymerized monomers.

7. The method of claim 1, wherein the interpolymerized monomers of the multistage latex polymer comprises no more than 15 wt-% DAAM, based on the total weight of the interpolymerized monomers.

8. The method of claim 1, wherein causing comprises applying the coating composition to a cementitious substrate, instructing it to be applied to a cementitious substrate, or supplying it to a user to apply it to a cementitious substrate.

9. The method of claim 1, wherein the wet look coating composition provides a hardened coating having a percent wet look of greater than 50% on a cementitious substrate according to the Wet Look Test described in the Examples Section.

10. The method of claim 1, wherein the wet look coating composition provides a hardened coating having a 6-hour percent blush that is less than 20% on black glass according to the Blushing Test described in the Examples Section.

11. The method of claim 1, wherein the multistage latex polymer is formed using a crosslinking molecule for crosslinking with DAAM.

12. The method of claim 11, wherein the crosslinking molecule comprises reactive amine or hydrazide groups and is present in an amount such that the ratio of reactive amine or hydrazide groups to keto groups present in the emulsion is less than 0.5 and greater than 0.15.

13. A low VOC aqueous wet look coating composition, the composition comprising:
   a multistage latex polymer comprising an emulsion polymerized first stage and an emulsion polymerized second stage; wherein the multistage latex polymer has an overall Fox equation Tg of at most 5° C. and comprises:
      interpolymerized monomers comprising diacetone acrylamide (DAAM);
      greater than 1 wt-% of a chain transfer agent, based on the total weight of monomers used to form the multistage latex; and
      at least one stage having a measured Tg of at least 60° C.;
   wherein the composition comprises less than 100 g VOC/L, according to ASTM D6886-2018.

14. The composition of claim 13, wherein the multistage latex polymer comprises core-shell polymer particles.

15. The composition of claim 14, wherein the DAAM is in the core of the core-shell polymer particles.

16. The composition of claim 13, wherein the interpolymerized monomers of the multistage latex polymer comprises no more than 50 wt-% DAAM, based on the total weight of the interpolymerized monomers in the first stage.

17. The composition of claim 14, wherein the chain transfer agent is in the shell of the core-shell polymer particles.

18. The composition of claim 14, wherein the core of the core-shell polymer particles has a measured Tg of at least 60° C.

19. The composition of claim 13 comprising less than 50 g VOC/L.

20. The method of claim 1, wherein the multistage latex polymer comprises greater than 1 wt-% of a chain transfer agent, and up to 2 wt-% of the chain transfer agent, based on the total weight of monomers used to form the multistage latex polymer.

21. The composition of claim 13 which forms a hardened coating having a percent wet look that is greater than 50% on a cementitious substrate according to the Wet Look Test described in the Examples Section.

22. The composition of claim 13 which forms a hardened coating having a 6-hour percent blush that is less than 20% on black glass according to the Blushing Test described in the Examples Section.

23. The composition of claim 13 which forms a hardened coating having a 12-hour percent blush that is less than 20% on black glass according to the Blushing Test described in the Examples Section.

24. The composition of claim 13 wherein the multistage latex polymer is formed using a crosslinking molecule for crosslinking with DAAM.

25. The composition of claim 24, wherein the crosslinking molecule comprises reactive amine or hydrazide groups and is present in an amount such that the ratio of reactive amine or hydrazide groups to keto groups present in the emulsion is less than 0 S and greater than 0.15.

26. A method of coating a cementitious substrate, the method comprising:
  causing a wet look coating composition to be applied to at least a portion of the cementitious substrate to provide a hardened wet look coating, the coating composition comprising:
    a multistage latex polymer comprising an emulsion polymerized first stage and an emulsion polymerized second stage;
    wherein the multistage latex polymer comprises:
      interpolymerized monomers comprising diacetone acrylamide (DAAM);
      at least one stage having a measured Tg of at least 60° C.; and
      core-shell polymer particles, wherein the shell of the core-shell particles is formed from components comprising one or more chain transfer agents;
    wherein the composition comprises less than 100 g VOC/L, according to ASTM D6886-2018.

27. The method of claim 26, wherein the core of the core-shell polymer particles has a measured Tg of at least 60° C.

28. The method of claim 26, wherein the multistage latex polymer comprises at least 0.5 wt-% and no more than 15 wt-% of DAAM, based on the total weight of the interpolymerized monomers.

29. The method of claim 26, wherein the shell of the core-shell particles is formed from components comprising one or more chain transfer agents in an amount of greater than 1 wt-% and up to 6 wt-%, based on the total weight of monomers.

30. The method of claim 26, wherein the one or more chain transfer agents are selected from dodecanethiol, 3-mercaptopropionic acid, isooctyl thioglycolate, butyl mercapto propionate, and combinations thereof.

* * * * *